June 3, 1924.  
J. H. RAMSEY  
1,496,021  
ROCKER JOINT FOR CHAINS AND OTHER DEVICES  
Original Filed March 24, 1919   5 Sheets-Sheet 1
Fig. 1,
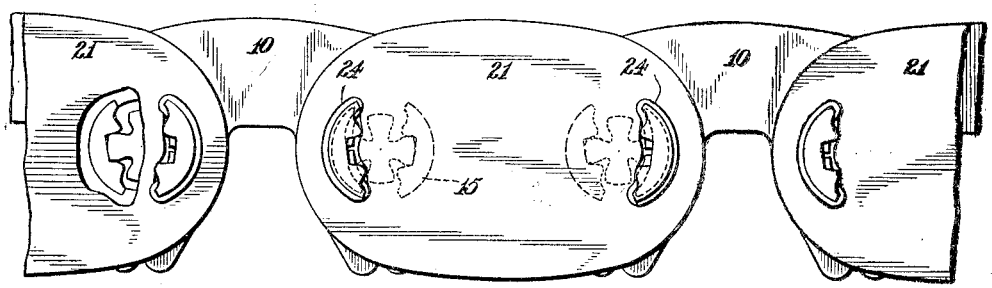
Fig. 2,
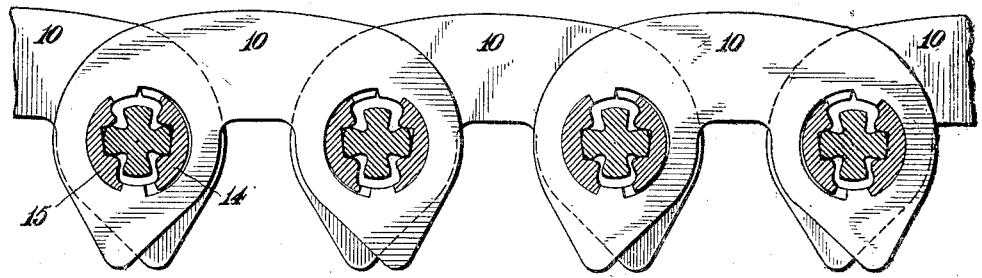
Fig. 3,
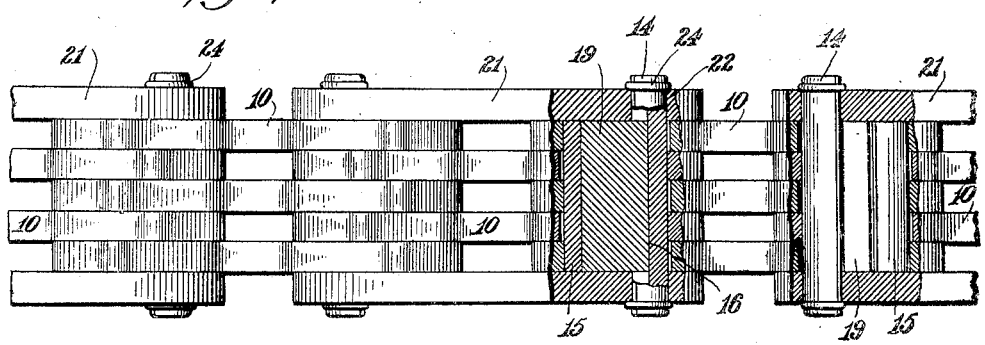
INVENTOR  
J. H. Ramsey  
BY  
Kerr, Page, Cooper & Hayward  
ATTORNEYS

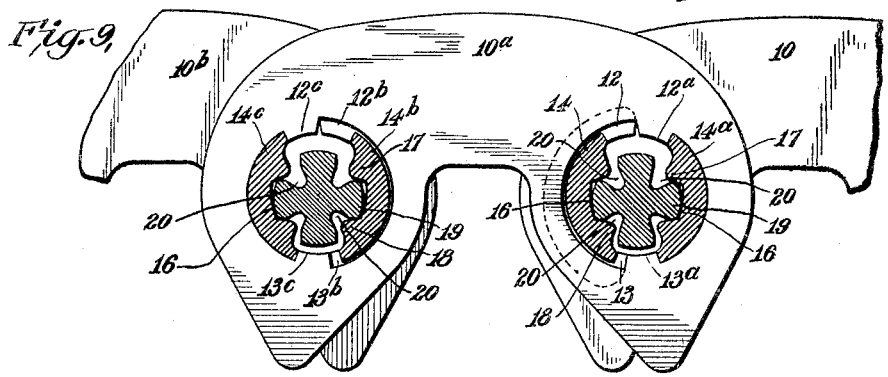
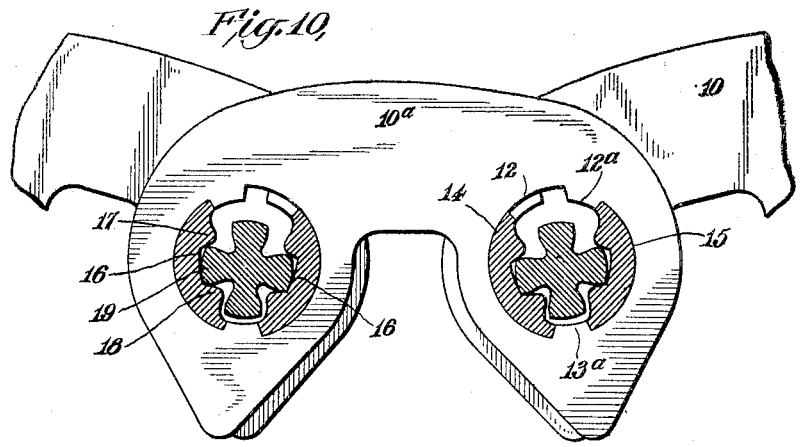
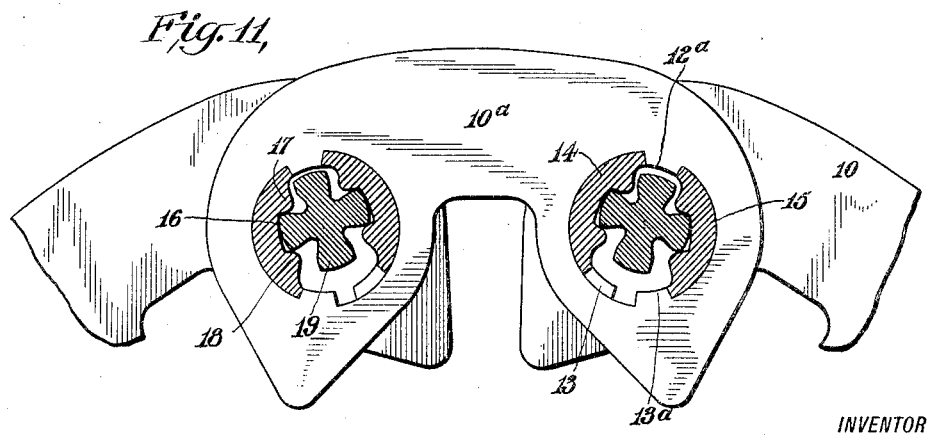

June 3, 1924.
J. H. RAMSEY
ROCKER JOINT FOR CHAINS AND OTHER DEVICES
Original Filed March 24, 1919    5 Sheets—Sheet 4
1,496,021
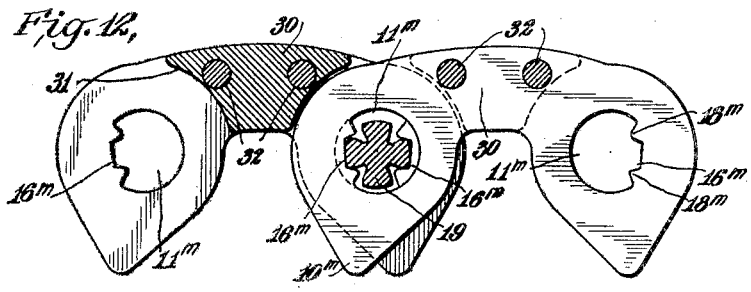
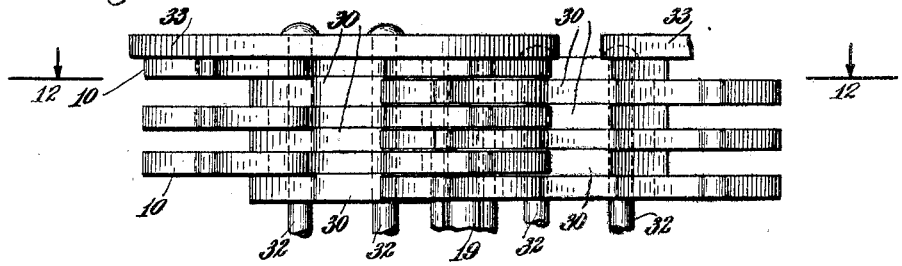
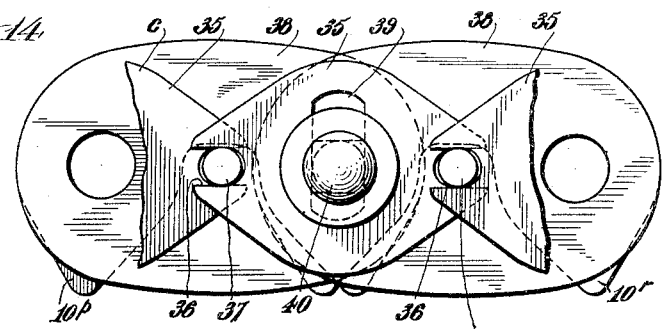
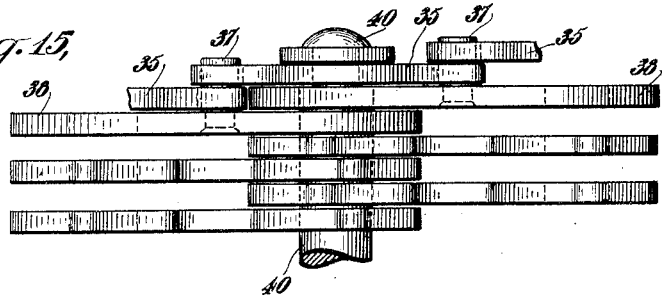
INVENTOR.
J. H. Ramsey
BY
Kerr, Page, Cooper & Hayward
ATTORNEYS

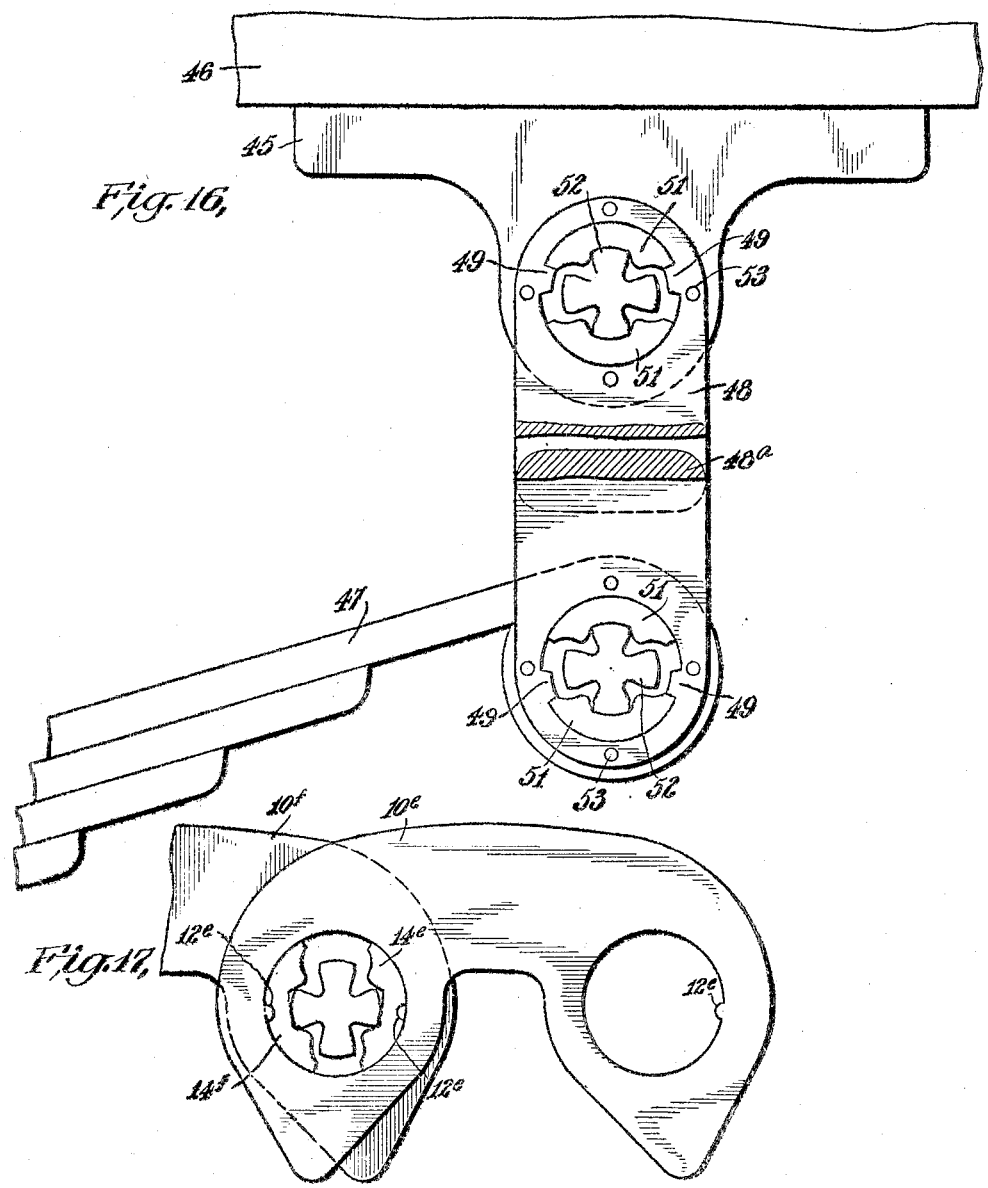

Patented June 3, 1924.

1,496,021

UNITED STATES PATENT OFFICE.

JOSEPH H. RAMSEY, OF ALBANY, NEW YORK, ASSIGNOR, BY MESNE ASSIGNMENTS, TO RAMSEY CHAIN CO. INC., OF ALBANY, NEW YORK, A CORPORATION OF NEW YORK.

ROCKER JOINT FOR CHAINS AND OTHER DEVICES.

Application filed March 24, 1919, Serial No. 284,546. Renewed March 4, 1924.

*To all whom it may concern:*

Be it known that I, JOSEPH H. RAMSEY, a citizen of the United States, residing at Albany, in the county of Albany and State of New York, have invented certain new and useful Improvements in Rocker Joints for Chains and Other Devices, of which the following is a full, clear, and exact description.

This invention relates to flexible joints for chains and other devices, particularly joints of the rocker type, and its chief object is to provide, for example in a chain in which each of two adjoining or co-operating links is provided with a rocking surface, means whereby the relative angular movement of the links is divided substantially equally between the two, thus markedly diminishing the tendency to wear and the consequent stretching of the chain. Another object is to provide a joint in which wear can be taken up and permit reassembly of the worn parts without substituting new parts. To this and other ends the invention consists in the novel features of construction and combination of elements hereinafter described.

One form of the invention as embodied in a chain, is illustrated in the accompanying drawings, in which:

Figure 1 is a side view of a portion of my improved chain.

Fig. 2 is a longitudinal sectional view.

Fig. 3 is a plan view, partly in horizontal section at two of the joints.

Fig. 9 is a large scale view, in longitudinal section, showing the relative positions of the parts when the chain is straight, without flexure in either direction.

Fig. 10 is a view similar to Fig. 9 but showing the chain in a flexed position caused by sagging.

Fig. 11 is a view similar to Fig. 9 but showing the chain in a flexed position such as assumed when running over a gear or sprocket.

Fig. 12 is a longitudinal section and Fig. 13 a plan view of another form of the invention.

Fig. 14 is a side view and Fig. 15 a plan view of still another form.

Fig. 16 is a side view and Fig. 17 an end view (from the right of Fig. 16) showing a form of the invention as embodied in a spring shackle for automobiles and other vehicles.

Fig. 17 is a side view of two co-operating links, illustrating a modification.

Fig. 18 is an end view of a pintle used in the construction shown in Fig. 17.

Figure 5:
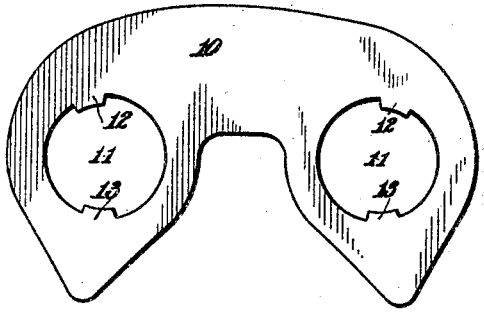
Fig. 5 is a side view of one of the links.
Figure 6:
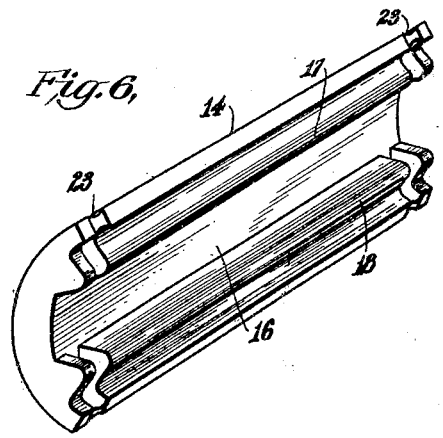
Fig. 6 is a perspective view of one of the long pintles.

In the chain illustrated the links (except the side plates described below) are all exactly alike in size and contour and overlap at their ends in the usual manner, as in Fig. 3, to bring the pintle-apertures into suitable registry. Each link, as 10, Fig. 5, is symmetrical as regards right and left sides or portions, having at each end an aperture 11, and each aperture has inwardly extending upper and lower stops or lugs 12, 13, dividing the aperture into two pintle-spaces. The upper lugs are on the outer sides of the vertical center lines of the apertures, and the lower lugs lie more on the outside of the said center lines than on the inside, thus making the inner pintle-spaces wider (circumferentially) than the outer spaces. The pintles, of which one is shown at 14 in Fig. 6 and another at 15 in Fig. 7, fit into the outer spaces. It will be observed, in Fig. 9 for example, that when the chain is assembled, with the links overlapped to receive the pintles, the wide pintle-spaces in one transverse set of links are aligned (transversely of the chain) with the narrow pintle-spaces in the adjoining or co-operating set of links. Each pintle is therefore secured between the stops or lugs of alternate links but can move (in general, revolubly about the axis of the aperture) in the wide pintle-spaces of the intermediate links. Thus in Fig. 9, for example, pintle 14 is held between lugs 12 and 13 of link 10 but as the links flex, say to the position shown in Fig. 10 or to that shown in Fig. 11, the said pintle 14 moves freely in the wide pintle-spaces between lugs or stops 12ª and 13ª of adjacent link 10ª. In like manner pintle 14ª is held in the short space between lugs 12ª and 13ª of link 10ª and is free to move in the wide pintle-space between lugs 12 and 13 of link 10. At the other end of link 10ª, pintle 14ᵇ is held in the narrow space between lugs 12ᵇ and 13ᵇ of link 10ᵇ and moves in the wide space between lugs 12ᶜ and 13ᶜ of link 10ª; while pintle 14ᶜ is held between lugs 12ᶜ and 13ᶜ and moves between lugs 12ᵇ and 13ᵇ.

From the foregoing it will be seen that the purpose of the lugs 12 and 13, dividing the apertures into wide and narrow spaces, is to hold one pintle stationary relatively to one set of links and to hold the other pintle stationary relatively to the other set of links. Various other means for the same purpose may be used, as for example the construction shown in Figs. 17 and 18. Here each aperture is provided with a single lug, 12ᵉ, and in the back of each pintle is a groove 12ᶠ to engage the lug. It will be clear that in Fig. 17, pintle 14ᵉ can swing in link 10ᵉ but cannot move in link 10ᶠ. Similarly, pintle 14ᶠ can swing in link 10ᶠ but cannot move in link 10ᵉ.

In the present embodiment certain pintles are longer than the rest, for the purpose hereinafter explained. Otherwise they are alike, each having a central substantially plane rocking surface 16, Figs. 6 and 7, at the bottom of a groove extending longitudinally of the pintle (transversely of the chain when the latter is assembled). Ribs 17, 18 are provided at the sides of the groove. From Figs. 2 and 3 it will be apparent that the transversely extending pintles, in the present instance the pintles 14 and 15, may be conveniently termed connecting members for the links or other parts which are to be flexibly joined.

Figure 8:
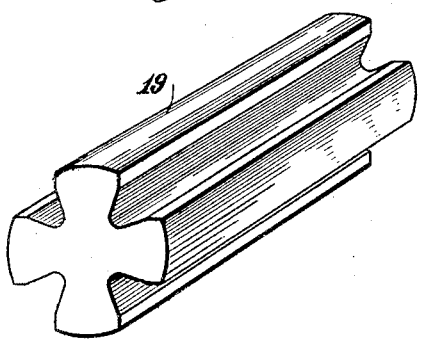
Fig. 8 is a perspective view of one of the rockers on which the rocking surfaces of the pintles bear.

Between the pintles at each joint, when the chain is assembled, is a transverse pin 19, Fig. 8, having a plurality of equiangularly spaced ribs, in the present instance four in number. The outer surfaces of the ribs are preferably cylindrical in curvature so as to rock smoothly on the contiguous rocking surfaces of the pintles, as indicated in Figs. 9, 10 and 11. Preferably the aforesaid cylindrical surfaces are co-axial. I also prefer to have the diameter through one pair of arms slightly longer than the other. When the chain is new the pins or rockers 19 are arranged with their shorter diameters horizontal. As the parts suffer wear the chain becomes longer (or "stretches"), and eventually the total wear or stretch at the joint between adjoining sets of links is equal to the difference between the two diameters of the rockers. In such case the original "pitch" of the chain can be restored merely by removing the pins, giving them a quarter-turn, and re-inserting them, as will be readily understood. This is a highly advantageous feature of my invention.

One purpose of the ribs 17, 18, at the sides of the rocking surfaces 16, Figs. 6, 7, 9, 10 and 11, is to deepen the groove and thus provide a deep seat for the co-operating rocker-rib. They also contribute to the strength of the pintles. In the embodiment shown, the rocker-ribs are accordingly undercut, to permit the rocker-pin to roll or rock on the surfaces 19 without striking the ribs 17, 18. The clearances thus provided are advantageous features, inasmuch as they afford spaces for grease, permitting the joint to be well packed, and for dirt which may find its way between adjacent overlapped links. Thus particles of grit or the like working down between the links 10 and 10ª in Fig. 9 tend to lodge in the V-shaped recesses 20 between the ribs of the rocker 19, instead of into the grooves in the pintles and upon the rocking surfaces. Moreover, the rocker-recesses 20 being packed with grease, the tendency of these recesses and the pintle-ribs 17 and 18 in their relative movements as the links flex toward the positions shown in Figs. 10 and 11, is to work out of the pintle-grooves any dirt that may find its way into the same. As a result there is less wear between the rocking surfaces 16 and the contacting faces of the rocker-ribs.

Figure 4:
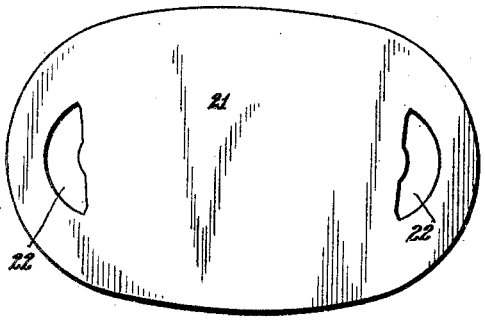
Fig. 4 is a side view of one of the side plates.

As stated above, some of the pintles in the construction illustrated are longer than the others. In practice the short pintles, shown at 15 in Figs. 3 and 7, reach just to the inner faces of the side plates 21 (see Figs. 1, 3 and 4) so as to be held thereby against displacement transverse to the chain. The long pintles 14, extend through suitably shaped openings 22 in the side plates and may be riveted in place or may be provided with circumferential grooves 23, Fig. 6, to receive wire clips 24, Figs. 1 and 3, which serve to prevent transverse displacement of these pintles, as will be readily understood. The clips are readily removed, however, permitting the long pintles to be drawn out when it is desired to take one or more joints apart.

Upon reference to Fig. 9 is will be seen that in a given joint the rocking surfaces 16 (in the present instance slightly curved, preferably cylindrically) are not parallel when the chain is straight but make an acute angle with each other. This arrangement though not essential is advantageous, and in practice I prefer to make the aforesaid angle about 10°, that is, 5° on each side of the vertical center line of the joint.

Referring again to Fig. 9, suppose the chain travelling in the direction of the arrow toward the driving gear. It will be observed that in each wide-pintle space, for example the spaces between lugs 12ª and 13ª, and 12ᶜ and 13ᶜ, of link 10ª, there is slight clearance (shown considerably exaggerated over what is used in practice) between the curved edges of the pintle-spaces and the curved surfaces of the pintles, 14, and 14ᵇ. This reduction of the size of the link-apertures to practically the diameter of the two pintles and the interposed rocker-pin affords certain important advantages. For instance, it practically eliminates backlash, and the distortion due to vertical movement of one link relative to the other. A more important advantage is that it causes every flexing movement to be divided equally between the two links. To understand this effect more clearly, imagine that the wide pintle-space between lugs 12ª and 13ª is large for instance as indicated by the dotted lines, as it would be if prior practice were followed. (It should be remembered, in this connection, that the corresponding wide space between lugs 12 and 13 would also be large.) Imagine also that flexure at the joint between links 10 and 10ª begins, as by reason of the chain encountering a gear-tooth. It is certain, from experience with prior chains, that as the flexure begins the adjacent end of link 10 would rise relatively to link 10ª, thereby carrying pintle 14 far up in the large space provided for its movement. If, as supposed, the design is in accordance with prior practice in rocker-joint chains, this pintle-space is so large that the movement of the pintle therein never brings the pintle into contact with the edge of the pintle-space. Consequently there would be no rocking movement, or at most a limited movement, between pintle 14 and rocker 19. On the contrary the latter would rock on pintle 14ª alone and the pintle 14 would simply rise in a curved path about an axis which is the shifting line of contact between pintle 14ª and the rocker. In other words, the entire rocking movement or substantially the entire movement, would take place on the pintle 14ª. In my chain, however, the upward movement of pintle 14 immediately brings it into contact with the edge of the aperture, and thereafter it must move in an arc substantially co-axial with the aperture, eventually reaching the position shown in Fig. 11 if the flexure is great enough. But such movement cannot occur without a rocking movement between the pintle and the rocker-pin 19. The net result is that the total rocking movement is divided with substantial equality between the two pintles, thereby reducing to a minimum the angular movement between each two co-operating parts. This markedly diminishes the relative movement between the co-operating surfaces and hence diminishes wear, with less stretching of the chain with use. It also permits use of the special type of rocker illustrated in Fig. 8. When the flexure is in the other direction, due to sagging of the chin, the movement of the free pintle in its space takes place in the opposite direction, as will be readily understood. It should be further noted that in my chain the relative movement of the rocker-pin and the cooperating pintles may involve a certain amount of slip of one on the other. Such slip is desirable in a chain designed to permit large angular movement between the links, but where the flexure is small the slip may be eliminated.

In the form shown in Figs. 12 and 13 removable pintles are not used, but the equivalent is provided by giving each link-aperture 11ᵐ a rocking surface or edge 16ᵐ on the outer side of the aperture so that when the chain is assembled the transversely aligned rocking edges constitute in effect a single rocking surface for the contiguous rib of the rocker 19. At the sides of the rocking edges are lugs 18ᵐ. When the chain is assembled the transversely aligned lugs form what are in effect ribs like those shown at 17 and 18 in Figs. 6 and 7 for example, with the same functions. In other words, in the embodiments shown in Figs. 12 and 13 the pintles are integral, so to speak, with the links. These figures also illustrate another means for dividing the rocking movement equally at each flexure of the joint. For this purpose the link-apertures 11ᵐ are made substantially concentric with the ends of the links, and between each two laterally spaced links is a controlling member 30 having curved under-cut end-edges 31 conforming and in close proximity to the ends of the adjacent links. Now if the rocker 19 tends to rock only on the surface 16ᵐ with which it is in contact on the right, the upper edge of link 10ᵐ at once engages the adjacent edge of member 30 and is compelled by the latter to swing on the axis of the transversely aligned apertures as a center. The latter movement, however, cannot take place unless the left hand surface 16ᵐ also rocks on a rocker 19. A little reflection will also make it clear that the rocking movement must be substantially the same on each side of the rocker.

The controlling members can be attached individually to the adjacent links, but a simpler method is to hold them in place by means of pins 32 extending clear through the chain. Alternate pairs of these pins can then be used to hold the side plates, as 33. The intermediate pairs of pins, and the rockers 19, are held by the ends of the side plates, as indicated in Fig. 13.

In the construction illustrated in Figs. 14 and 15 the chain is equipped on each side with guide plates 35 (one on each side of each joint), having their ends overlapped between the joints and provided with outwardly open longitudinal slots 36 which engage studs 37 mounted in the side plates 38. The guide plates are also formed with vertical slots 39 to fit the flattened sides of the ends of the pivot pins 40. Evidently in any flexing movement of the links the slot 39 always bisects the angle between the two. Hence neither link can swing on the pin through a greater angle than the other; or, in other words, the movement at the joint is equally divided between the two. For the purpose of keeping the figures as simple as possible a simple pivot pin is shown in Figs. 14 and 15, but it is clear that the rocker-joint construction can be used if desired.

Figure 7:
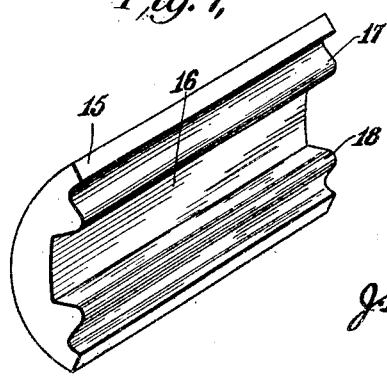
Fig. 7 is a perspective view of one of the short pintles.

As an example of the other uses of the invention I have shown it in Fig. 16 applied to a spring shackle for automobiles and other vehicles. In the construction illustrated, 45 designates a bracket suitably mounted on a member 46 of the chassis frame. The spring 47 and the bracket 45 are embraced by a pair of side links 48, connected by a transverse web 48ª. Each link has pintle apertures at its ends, divided by lugs 49 into wide and narrow pintle-spaces. Pintles 51 of the type shown in Fig. 7 are seated in the narrow spaces, with rockers 52, of the type shown in Fig. 8, between them. To retain the parts in position and protect the joints from dirt they may be covered with suitable disks or caps, not shown, secured by means of screws in the holes 53 in the links.

It is to be understood that the invention is not limited to chains, nor to the specific construction herein illustrated and described, but can be embodied in other forms and may be used for other purposes without departure from its spirit.

I claim:

1. In a joint for chains and other devices, the combination with the parts which are to be joined, having registering apertures of a pin extending transversely through the apertures, and means for compelling each of said parts to turn about the axis of the pin at each flexure of the joint, comprising a pair of pintles having rocking engagement with the pin on opposite sides thereof and extending through said apertures and having only sufficient clearance therein to permit revoluble movement of the pintles in said apertures.

2. In a rocker joint for chains and other devices, the combination with the parts which are to be connected, of spaced members within the parts connected thereby; a device between said members upon which the latter can rock, and means for compelling each of said members to rock on said device at each flexure of the joint.

3. In a rocker joint for chains and other devices in which overlapping oppositely extending parts are to be flexibly connected, the combination with such parts, of a pair of spaced connecting members extending transversely through said parts, a rocker-pin between said members upon which they can rock, and means for causing said members to rock on said pin substantially equally when the joint is flexed.

4. In a rocker joint for chains and other devices, the combination with overlapping parts which are to be flexibly connected, of a pair of spaced transverse pintles extending through said parts and each having a rocking surface, a rocker-pin interposed between said pintles and bearing on the rocking surfaces thereof, and means for compelling the two pintles to rock substantially equally on the pin when the joint is flexed.

5. In a rocker joint for chains and other devices, the combination with overlapped oppositely extending parts having transversely aligned apertures; spaced transverse pintles held in the apertures, having their outer surfaces conforming and in close proximity to the adjacent edges of the apertures but said pintles being revolubly movable in the apertures; and a rocker-pin between the pintles upon which the inner surfaces of the latter can rock as the joint is flexed.

6. In a rocker joint for chains and other devices, the combination with overlapping oppositely extending parts having transversely aligned apertures; spaced transverse pintles extending through said apertures; means for holding each pintle stationary relatively to one set of parts but permitting revoluble movement of the pintle relatively to the other set but having substantially no movement otherwise; and a rocker-pin between the pintles on which both the latter can rock.

7. In a rocker joint for chains and other devices, the combination of overlapped oppositely extending parts having transversely aligned apertures of substantially circular shape each having oppositely located stops defining wide and narrow pintle-spaces, the wide pintle-spaces of each part being in alignment with the narrow pintle-spaces of the adjacent part; a pair of pintles held between the stops in the said narrow spaces and having curved outer surfaces conforming and in close proximity to the curved edges of the wide pintle-spaces but revolubly movable therein as the joint is flexed; and a transverse member between the pintles on which the latter may rock.

8. In a rocker point for chains and other devices, the combination with the parts which are to be connected, of spaced members extending transversely through the said parts and having rocking surfaces inclined at an angle to each other when the chain is straight, and a rocking device arranged between the members and cooperating with said rocking surfaces.

9. In a rocker joint for chains and other devices, the combination with oppositely extending parts which are to be connected; of a pair of spaced symmetrically arranged pintles extending through said parts and having rocking surfaces inclined at an angle to each other when the chain is straight, each pintle being stationary in one part but movable in the adjacent oppositely extending part; and a rocker-pin between the pintles to cooperate with said inclined rocking surfaces.

10. In a rocker joint for chains and other devices, the combination of overlapped oppositely extending parts having transversely aligned apertures each provided with inwardly extending stops defining wide and narrow pintle-spaces inclined at an angle to each other; transverse pintles held in the said narrow spaces and movable in the wide spaces and having rocking surfaces inclined at an angle to each other; and a rocker-pin between the pintles to cooperate with said rocking surfaces as the joint is flexed.

11. In a rocker joint for chains and other devices, the combination of overlapped oppositely extending parts having transversely aligned apertures of substantially circular shape each divided into wide and narrow pintle-spaces inclined at an angle to each other, the wide spaces of each part being in alignment with the narrow space of the adjacent part; spaced transverse pintles held in the narrow pintle spaces and revolubly movable in the wide spaces, having curved outer surfaces conforming and in close proximity to the curved edges of the wide spaces, and having inwardly disposed rocking surfaces inclined at an angle to each other; and a rocking device between the pintles to cooperate with the rocking surfaces thereon.

12. In a rocker joint for chains and other devices, the combination with the parts which are to be connected, of spaced members extending transversely through the parts and having rocking surfaces inclined at an angle to each other, a device between said members upon which said surfaces can rock, and means for compelling each of said members to rock on said device at each flexure of the joint.

13. In a rocker joint for chains and other devices, the combination with overlapping oppositely extending members having transversely aligned apertures of substantially circular shape, each having oppositely located stops defining wide and narrow pintle-spaces inclined at an angle to each other of transverse pintles held in said narrow spaces and movable revolubly in the wide spaces and having their outer surfaces conforming and in close proximity to the outer edges of said wide spaces, the pintles having in their inner faces longitudinal grooves provided with ribs at their sides and with bottoms inclined at an angle to each other and constituting rocking surfaces; and a rocking member having a plurality of pairs of ribs arranged between the pintles with a pair of ribs seated in said grooves whereby the rocking surfaces therein can rock on the cooperating ribs of the rocking members.

14. In a rocker joint for chains and other devices, the combination with overlapping oppositely extending parts having transversely aligned apertures; of transverse pintles extending through said apertures and provided on their inner faces with grooves having ribs at their sides and having bottoms constituting rocking surfaces; and a rocking member having a plurality of pairs of ribs, arranged between the pintles with a pair of ribs seated in said grooves whereby the rocking surfaces therein can rock on the cooperating ribs of the rocking member.

15. In a rocker joint for chains and other devices, the combination with the parts which are to be connected; of pintles extending through said parts and having inwardly disposed grooves with bottoms constituting rocking surfaces; and a device having a plurality of pairs of ribs, arranged between the pintles with one of its pairs of ribs cooperating with the rocking surfaces, the diameter of the device through one pair of ribs being longer than the diameter through another pair.

16. In a rocker joint for chains and other devices, the combination with the parts which are to be joined; of spaced pintles extending through said parts and having rocking surfaces; and a rocking device having a plurality of pairs of diametrically spaced ribs, arranged between the pintles with one of its pairs of ribs cooperating with said rocking surfaces, the diameter of the rocking device through one pair of ribs being longer than the diameter through another pair.

17. In a rocker joint for chains and other devices, the combination with parts having spaced rocking surfaces; of a rocker-pin between surfaces and having ribs provided with rocking faces spaced different distances apart whereby wear may be taken up by turning the rocker-pin to bring more widely spaced rocking faces into position for cooperating with the rocking surfaces.

18. In a rocker joint for chains and other devices, the combination with parts having spaced rocking surfaces; of a rocking pin between said surfaces, having four ribs spaced equiangularly, the diameter through one pair of ribs being greater than the diameter through the other pair.

19. In a rocker joint for chains and other devices, the combination with parts having spaced rocking surfaces and ribs at the sides of said surfaces; of a rocker-pin having in cross section the form of a Maltese cross, arranged between the rocking surfaces with a pair of diametrically spaced arms cooperating therewith.

20. In a rocker joint for chains and other devices, the combination with the parts which are to be connected, of spaced members within the parts connected thereby, and a device between said members upon which the latter can rock, having convex rocking surfaces in contact with the spaced members below the axis of articulation when the chain is straight.

21. In a rocker joint for chains and other devices, the combination of oppositely extending parts with a pintle, said parts having surfaces cooperating with the contiguous surfaces of the pintle for rocking engagement therewith and means for compelling each of said parts to rock on said pintle at each flexure of the joint.

In testimony whereof I hereunto affix my signature.

JOSEPH H. RAMSEY.